United States Patent
Higgins et al.

(10) Patent No.: US 8,340,925 B2
(45) Date of Patent: Dec. 25, 2012

(54) VEHICLE FUEL CONSUMPTION CALCULATOR

(75) Inventors: Paul Higgins, Abbotsford (CA); Graham Williams, Vancouver (CA)

(73) Assignee: Webtech Wireless Inc., Burnaby, British Columbia (CA)

( * ) Notice: Subject to any disclaimer, the term of this patent is extended or adjusted under 35 U.S.C. 154(b) by 327 days.

(21) Appl. No.: 12/813,344

(22) Filed: Jun. 10, 2010

(65) Prior Publication Data

US 2011/0307190 A1 Dec. 15, 2011

(51) Int. Cl.
*G01M 15/00* (2006.01)
*G06F 19/00* (2006.01)

(52) U.S. Cl. ............ 702/45; 701/33; 701/123; 702/55

(58) Field of Classification Search ............ 702/45, 702/50, 55, 136, 137, 138, 156, 174; 73/114.52, 73/114.53, 114.54; 123/304, 480; 701/33, 701/103, 123
See application file for complete search history.

(56) References Cited

U.S. PATENT DOCUMENTS

| | | | |
|---|---|---|---|
| 4,823,755 | A | 4/1989 | Hirose et al. |
| 6,038,917 | A | 3/2000 | Sember |
| 6,467,337 | B2 | 10/2002 | Sadahiro et al. |
| 7,454,962 | B2 | 11/2008 | Nishiyama et al. |
| 2007/0129878 | A1 | 6/2007 | Pepper |
| 2010/0049397 | A1 * | 2/2010 | Liu et al. .............. 701/33 |

FOREIGN PATENT DOCUMENTS

WO 2006126200 11/2006

OTHER PUBLICATIONS

Gianelli, R.A., et al. 2005. "Heavy-Duty Diesel Vehicle Fuel Consumption Modeling Based on Road Load and Power Train Parameters," Society of Automobile Engineers (SAE) International Congress 2005-01-3549.
EPI Inc. 2009. "Piston Engine Technology," Retrieved on Mar. 3, 2010 from EPI Inc.: http://www.epi-eng-com/piston_engine_technology/engine_technology_contents.htm.
Kwiatkowski, R. 2007. "Monitoring Fuel Consumption on Your Vehicle in Real-Time," Retrieved Mar. 17, 2010 from Windmill Software Ltd.: http://www.windmill.co.uk/obdii.pdf.
Lucius, J. 2004. "Air Flow and Fuel Flow Calculators," Retrieved Mar. 17, 2010 from Jeff Lucius and K2 Software: http://www.stealth316.com/2-air-fuel-flow.htm.
Warren. 2003. "Driveability Corner," Motor, Dec. 2003:16,21-22.

* cited by examiner

*Primary Examiner* — John H Le
(74) *Attorney, Agent, or Firm* — John R. Hanagan (57) ABSTRACT

Diesel fuel consumption is calculated in real-time in an vehicle diagnostic monitor using standard OBDII reported parameters and publicly available engine characteristics. Also, fuel consumption in vehicles that maintain a constant air-fuel ratio is calculated by analyzing the subject engine as an air pump and reading publicly available OBDII diagnostic data to estimate the instantaneous airflow through the engine without the need of MAF sensor data.

16 Claims, 8 Drawing Sheets

| data# | rpms | maf | Abs load | iat | STD temp | Air Density | Calc OEV | OEV Low | Rpm (low) | Cnt (lo) | OEV (hi) | Rpm (hi) | Cnt (hi) | Target RPM | New EV | Avgd EV |
|---|---|---|---|---|---|---|---|---|---|---|---|---|---|---|---|---|
| 1 | 2829 | 51.9 | 69 | 12 | 273.15 | 1.2754 | 2.61 | 2.61 | 2829 | 1 | 0.00 | 0.00 | 0 | 3000 | 0.00 | 0.00 |
| 2 | 3087 | 72 | 78 | 12 | 273.15 | 1.2754 | 2.94 | 2.61 | 2829 | 1 | 2.94 | 3087 | 1 | 3000 | 2.83 | 2.83 |
| 3 | 3249 | 69.8 | 71 | 11 | 273.15 | 1.2754 | 2.96 | 2.61 | 2829 | 1 | 2.96 | 3249 | 2 | 3000 | 2.76 | 2.79 |
| 4 | 2509 | 56.9 | 76 | 10 | 273.15 | 1.2754 | 2.91 | 2.91 | 2509 | 2 | 2.96 | 3249 | 2 | 3000 | 2.95 | 2.84 |
| 5 | 2559 | 58.9 | 75 | 9 | 273.15 | 1.2754 | 2.98 | 2.98 | 2559 | 3 | 2.96 | 3249 | 2 | 3000 | 2.97 | 2.88 |
| 6 | 3291 | 72.2 | 73 | 9 | 273.15 | 1.2754 | 2.92 | 2.98 | 2559 | 3 | 2.92 | 3291 | 3 | 3000 | 2.95 | 2.89 |

FIGURE 7

VEHICLE FUEL CONSUMPTION CALCULATOR

NOTICE REGARDING COPYRIGHTED MATERIAL

A portion of the disclosure of this patent document contains material which is subject to copyright protection. The copyright owner has no objection to the facsimile reproduction of the patent document or the patent disclosure as it appears in the Patent and Trademark Office file or records, but otherwise reserves all copyright rights whatsoever.

CROSS-REFERENCE TO RELATED APPLICATION

None.

FIELD OF THE INVENTION

This invention relates to the calculation of fuel consumption based on engine diagnostics.

BACKGROUND OF THE INVENTION

Diesel fuel consumption cannot be calculated in the simple way that gasoline fuel consumption can, because the air-fuel ration is not constant. Most current methods need to access proprietary information on fuel injector dwell times which is rarely easily available.

Also, the most convenient parameter with which to calculate gasoline fuel flow is MAF (mass airflow or, according to SAE J1979 PID 1-10). But a significant minority of passenger vehicles do not report MAF.

SUMMARY OF INVENTION

This invention calculates diesel fuel consumption in real-time in a vehicle diagnostic monitor using standard OBDII reported parameters and publicly available engine characteristics.

Also, this invention calculates the fuel consumption in vehicles that maintain a constant air-fuel ratio by analyzing the subject engine as an air pump and reading publicly available OBDII diagnostic data to estimate the instantaneous airflow through the engine without the need of MAF sensor data.

Accordingly, the present invention is directed to a computer-implemented method for calculating fuel consumption in an engine connected to an engine controller unit and using a type of fuel. The method includes the computer-implemented steps of: obtaining data relating to the engine from the engine controller unit: inferring the fuel type from the data: selecting, from a plurality of algorithms, an algorithm based on the fuel type; and calculating the fuel consumption using the selected algorithm.

BRIEF DESCRIPTION OF THE DRAWINGS

A better understanding of the present invention can be obtained when the following detailed description of the preferred embodiment is considered in conjunction with the following drawings, in which:

FIG. 2(*a*) is a flowchart of user inputs for the diesel case;

FIG. 2(*b*) is a flowchart of user inputs for the non-MAF case;

DETAILED DESCRIPTION

Well known in the art, is an automotive data acquisition system for collecting data from a vehicle, the system being connected to a second generation of on-board diagnostic (OBD-II) connector or a non-standard connector provided in a vehicle through a standard electrical protocol interface such as a CAN, J1580, or ISO9141 interface, amongst others. Herein, for the purposes of the current invention herein, J1979 is relevant to passenger (non-heavy duty) vehicles but the inventive principles herein are not limited thereto. Also, although the application of OBD-II is illustrated in the preferred embodiment, it will be appreciated that the automotive data acquisition system can also be applied or modified to applied to other or future generation of on-board diagnostic system without exceeding the scope of the current invention.

This invention uses standard, universal, publicly available, and mandated OBDII data parameters to calculate fuel consumption of a diesel engine. It does this by estimating the instantaneous power output of the engine and inferring the amount of fuel that is needed to produce this power. This provides the instantaneous fuel flow which is used to determine the fuel economy and total fuel used.

Also, although OBDII defines a message that identifies the type of fuel used in the engine, most vehicles do not support this message. The type of fuel can be inferred by querying the vehicle if it supports a specific set of parameters and deciding based on fuzzy logic.

This invention can be applied to all internal combustion engine types, both CI (compression ignited) and SI (spark plug ignited), using one of a plurality of fuels (gasoline, LNG, propane, ethanol), although simpler calculations for SI type engines can be used if the engine reports MAF. However, for engines that do not report MAF, this invention provides a practical alternative.

The SAE J1979 standard defines a method for requesting various diagnostic data and a list of standard parameters that might be available from the electronic controller unit (ECU). The various parameters that are available are addressed by "parameter identification numbers" or PIDs which are defined in J1979. According to OBD-II, requests to a vehicle's ECU via the OBD-II port are made up of two bytes (excluding header and error correction). The first byte sets the desired mode of operation. There are currently nine modes of operation described in the OBD-II standard, including "show current data", "show freeze frame data" and "request vehicle information". The second byte is the requested parameter identification (PID) number. Vehicle manufactures are not required to support all modes, and are allowed to include custom modes above number 9.

P-codes, or OBD-II PIDs On Board Diagnostics "Parameter IDs", are codes used to request data from a vehicle, used as a diagnostic tool. Typically, a technician will use PIDs with a scan tool connected to the vehicle's OBD-II connector. The technician enters the PID. The scan tool sends to the vehicle's bus (CAN, VPW, PWM, ISO9141, KWP). A device on the bus recognizes the PID as one it is responsible for, and reports the value for that PID to the bus.

Herein, the step of "read from vehicle" or "read from PIDs" or cognate expressions, refers to reading from standard SAE OBDII PIDs and the like that provide information about the vehicle (and where the context suggests, may include customer-defined/monitored PIDs). Other standards are contemplated.

Diesel Fuel Calculation

The following equation is used to calculate fuel rate consumption for a given (class) of diesel engine:

$$\text{Volume Fuel Rate} = (RPM/(EnergyDensity*2*60))* (EstTorq*3600)/(1000*Density\_diesel) \quad \text{Eq. (1)}$$

where:

RPM=revolutions per minute converted into seconds and factored for a 4 stroke engine EnergyDensity=the energy density or specific energy of the fuel in use EstTorq=4*PI*(TorqueBrakeMax*CLV+FrictionTorque)/ENG_Eff TorqueBrakeMax is the maximum torque (at a given RPM). As a matter of implementation, by way of non-limiting example, this figure can be obtained in implementation by a table lookup function that finds the maximum published torque of that engine at the current RPM, where the table is a normalized representation of the engine's published characteristic torque curve.

CLV is the Calculated Load Value reported by J1979 as PID 1-04,

FrictionTorque is an estimate of the frictional torque losses as the product of Engine Displacement and a linear equation of RPM ENG_Eff is the generally accepted coefficient of efficiency for this class of subject engines Density_diesel is the density of the diesel fuel.

An example follows next.

Inputs read from the vehicle:

RPM=engine speed=1500 RPMs

CLV=calculated load value=25%

Constants for subject engine (configured by the user)

EngDisp=Engine Displacement=6.7 litres

Energy density of diesel fuel=42600 kJ/kg (or N–m/kg)

Eng_Eff=Engine class efficiency=43% p_DF=Diesel Fuel Density=0.85 kg/L

Brake Torque=maxTorque at 1500 RPM*CLV=880 N–m*25%=220.0 N–m

FrictionTorque=(0.0455*RPM+60)*EngDisp/(1000*4*PI)

=(0.0455*1500+60)*6700/(1000 cc/L*4*3.1416)=68.379 N–m

EquivTorque=(BrakeTorque+FrictionTorque)*4*PI/Eng_Eff

=((220.0+68.379)*4*3.1416))/0.43=2207.24 N–m

Fuel rate=(RPM [1/m]/(Energy Density[N–m/kg]*2*60 [sec/min]))*EquivTorque*(3600 [sec/hr]/(1000 [g/kg]* p_DF [kg/L]))=2.743 L/hr The constants, 2, 60, 3600 and the like, are merely conversion factors to normalize the dimensions and units, and are easily within the competency of the average skilled person.

Figure 1:
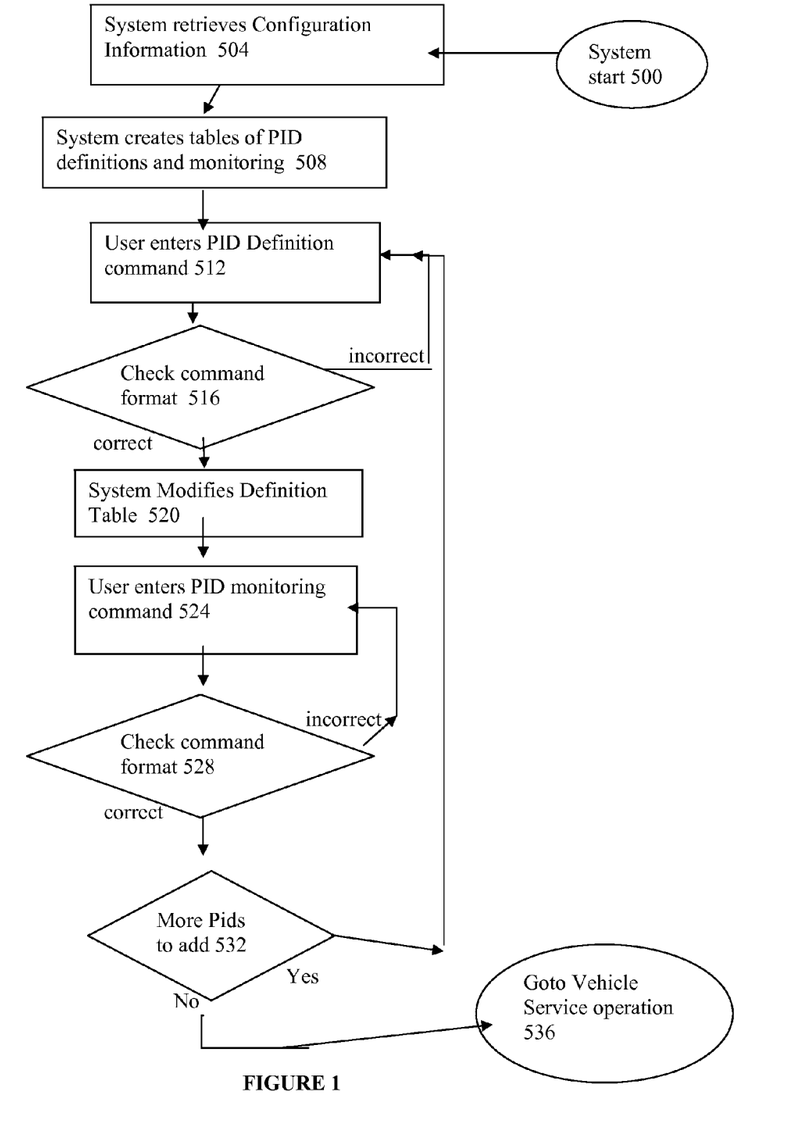
FIG. 1 is a flowchart of the initial configuration steps for the calculator.

The fuel consumption calculations of the present invention, initially require data to be from the diagnostic sources of engine and related information. With reference to FIG. 1, the following steps are performed.

Step 500 System start

Step 504 System retrieves Configuration Information

Step 508 System creates tables of PID Definitions and PID Monitoring

Step 512 User enters PID Definition command, i.e. identify PIDs that need to be read (these may be J1979 or user-defined ones)

Step 516 Check format of PID Definition command. If acceptable, proceed to Step 520.

Step 520 System modifies PID Definition Table

Step 524 User enters PID monitoring command. This is to configure the monitoring of the PID defined in step 512.

Step 528 Check format of PID monitoring command. If acceptable, proceed to Step 532.

Step 532 If there are more PIDs to add, return to Step 512; and otherwise, proceed to Step 536.

Figure 2A:
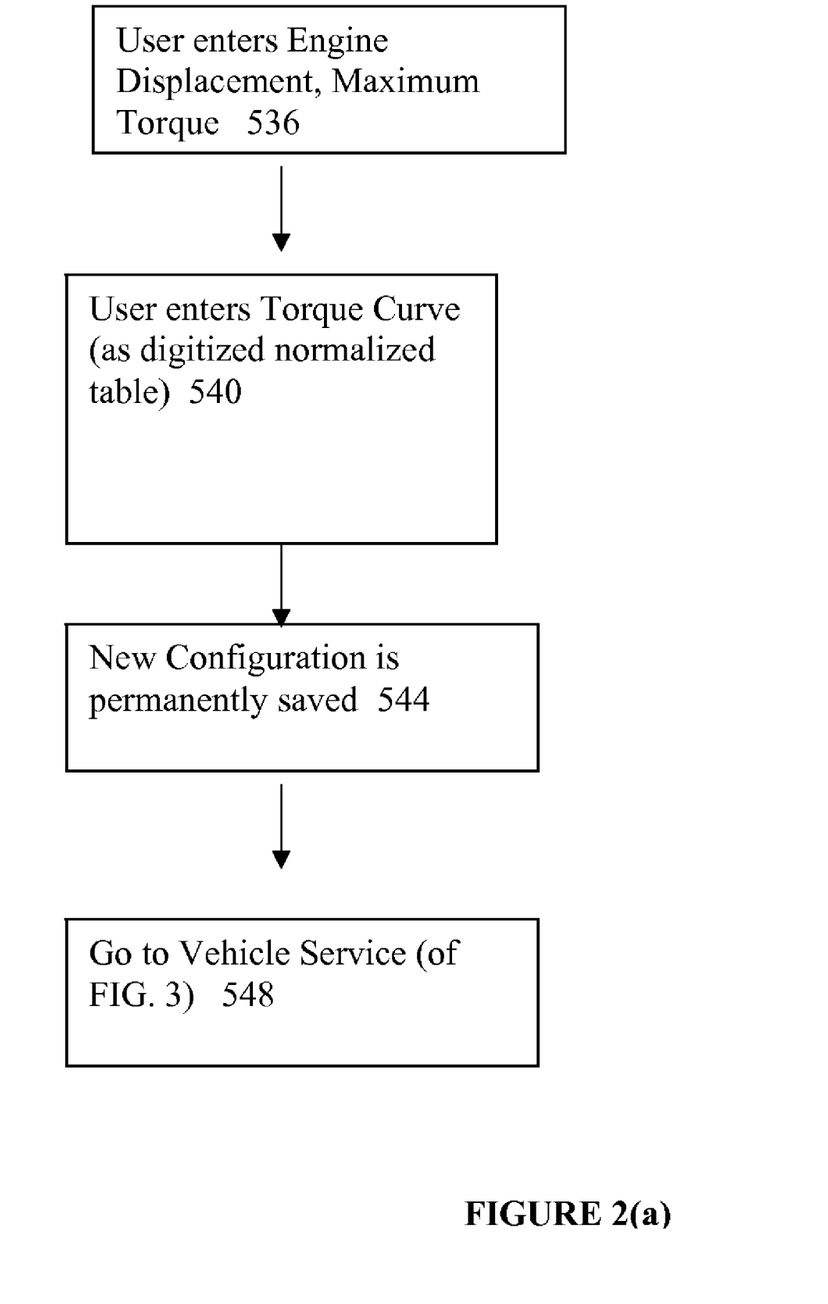

With reference to FIG. 2(a), the following steps are taken.

Step 536 User enters Engine Displacement and Maximum Torque for the subject engine (or for the applicable class of engines)

Step 540 User enters Torque Curve (which can be implemented as a digitized normalized table for the subject engine or applicable class of engines).

Step 544 New Configuration is permanently saved

Figure 3:
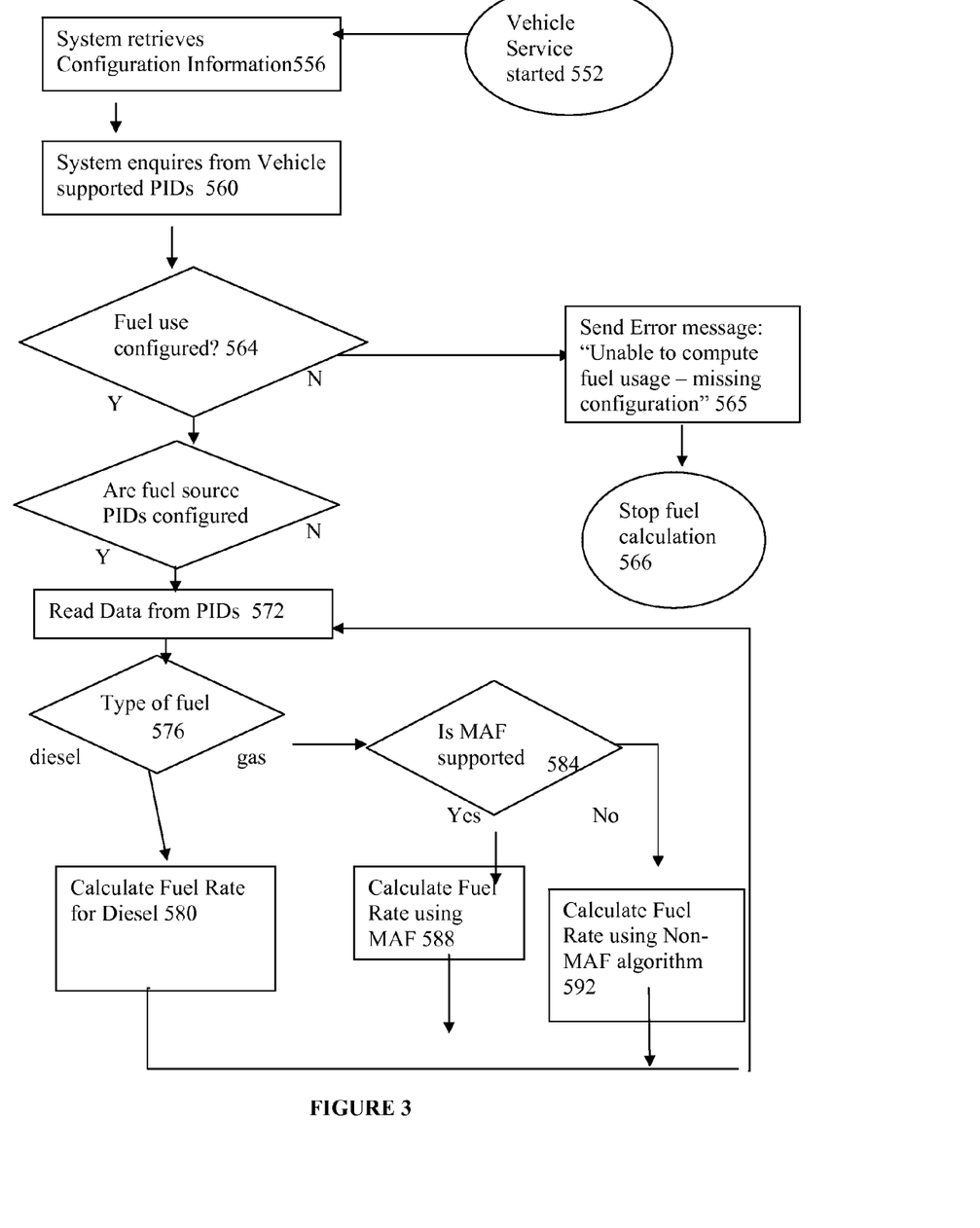
FIG. 3 is a flowchart of the steps (after user inputs and initial configuration) to decide the case/algorithm to use.

Step 548 Go to Vehicle Service operation (see FIG. 3)

With reference to FIG. 3, the following steps are taken.

Step 552 Vehicle Service started

Step 556 System retrieves Configuration Information

Step 560 System enquires from (vehicle supported) PIDs

Step 564 Is fuel use configured

Step 568 Are fuel source PIDs configured

Step 572 Read Data from PIDs.

Step 576 Decide on type of fuel (diesel or gas) by using read data of Step 572 and (where/when appropriate) fuzzy logic (explained below).

By interrogating the PIDs defined/supported, the type of subject engine can be inferred by a fuzzy logic table of the following J1979 PIDs, such as Table 1.

TABLE 1

| PIDs supported | 1-E Dwell time | 1-23 Inj.Pressure | 1-43 Abs.load val. | 1-6 ShtTermTrim | 1-7 LngTermTrim | Likely fuel type |
|---|---|---|---|---|---|---|
| | Y | n/a | Y | Y | Y | gas |
| | N | Y | N | N | N | diesel |
| | N | N | N | N | N | diesel |

Below is one implementation (by pseudo-code) for interrogating two specifics PID (Short Term and Long Term Trims) from Table 1 with references to the other PIDS. The fuzzy logic of Table 1 is useful without Short Term and Long Term Trims PIDs that report modifications of the AFR (air-fuel ratio). But since diesel engines do not control the AFR, it is unlikely that such PIDs would be reported by them; whereas in gas engines, such PIDS almost certainly would be supported.

```
//
    if( isSupported(PID_SHORT_FUEL_TRIM)) OR isSupported(
PID_LONG_FUEL_TRIM )
    {
    decrement( WeightingAsDieselType )
    increment( WeightingAsGasolineType)
    }
    else //
    {
    increment( WeightingAsDieselType )
    decrement( WeightingasGasolineType )
    }
    //.... other PID support tests (from as Table 1 above)
    //
    // decision on type of engine
    nTests = total number of tests for diesel or gasoline.
    if( WeightingAsDieselType / nTests
> WeightingAsGasolineType/ nTests + DECISION_HYSTERESIS/
nTests )
    {
    then EngineType = DIESEL;
    } else if (WeightingAsTypeGasoline/ nTests
> WeightingAsDieselType/nTests + DECISION_HYSTERESIS/nTests)
    {
    then EngineType = GASOLINE;
    }
    else
    EngineType = DONTKNOW;
    //need to get manual confirmation, or not calculate fuel consumption
```

DECISION_HYSTERESIS is a decision margin value between 0 and 0.5 that quantifies the uncertainty of getting inconsistent answers to testing. For example, with five tests, a 100% successful test for either type would result in a [1 to 0] weighting. However with inconsistent results, the value could be [0.6 to 0.4]. The simplest number would be zero and a decision would simplify to WeightingasDieselType>WeightingasGasType. However to provide more confidence, the DECISION_HYSTERISIS value can be increased to make a definitive outcome more rigorous. If the value was set at 0.25, for example, making a definitive decision requires that at least 67% of the tests resulted in favor of one type to make a decision. This value can be made dynamically configurable allowing for fine-tuning the decision algorithm.

Continuing with reference to FIG. 3, if diesel is inferred (in step 576) as the engine/fuel type, proceed to Step 580. If gas is inferred, proceed to Step 584 to determine if MAF is supported.

If MAF is supported, proceed to Step 588 to use conventional methods to convert MAF to calculate Fuel Rate consumption. Calculating Fuel Rate consumption using MAF is a standard technique for which many algorithms (many implemented and well tested) are freely available to those skilled in the art, and no further explanation thereof will be made herein.

If MAF is not supported, proceed to Step 592 to calculate non-MAF method.

If Fuel Use is not configured (as decided by Step 563), then send Error message: "Unable to compute fuel usage-missing configuration" and stop fuel calculations (Steps 565 and 566).

Step 584 Determine if MAF is supported. If supported, proceed to step 588. If not, proceed to step 592 and FIG. 6 for calculation for the non-MAF scenario.

Step 588 Calculate Fuel Rate using MAF. Calculating Fuel Rate consumption using MAF is a standard technique for which many algorithms (many implemented and well tested) are available to those skilled in the art and no further explanation thereof will be made thereof.

Figure 6:
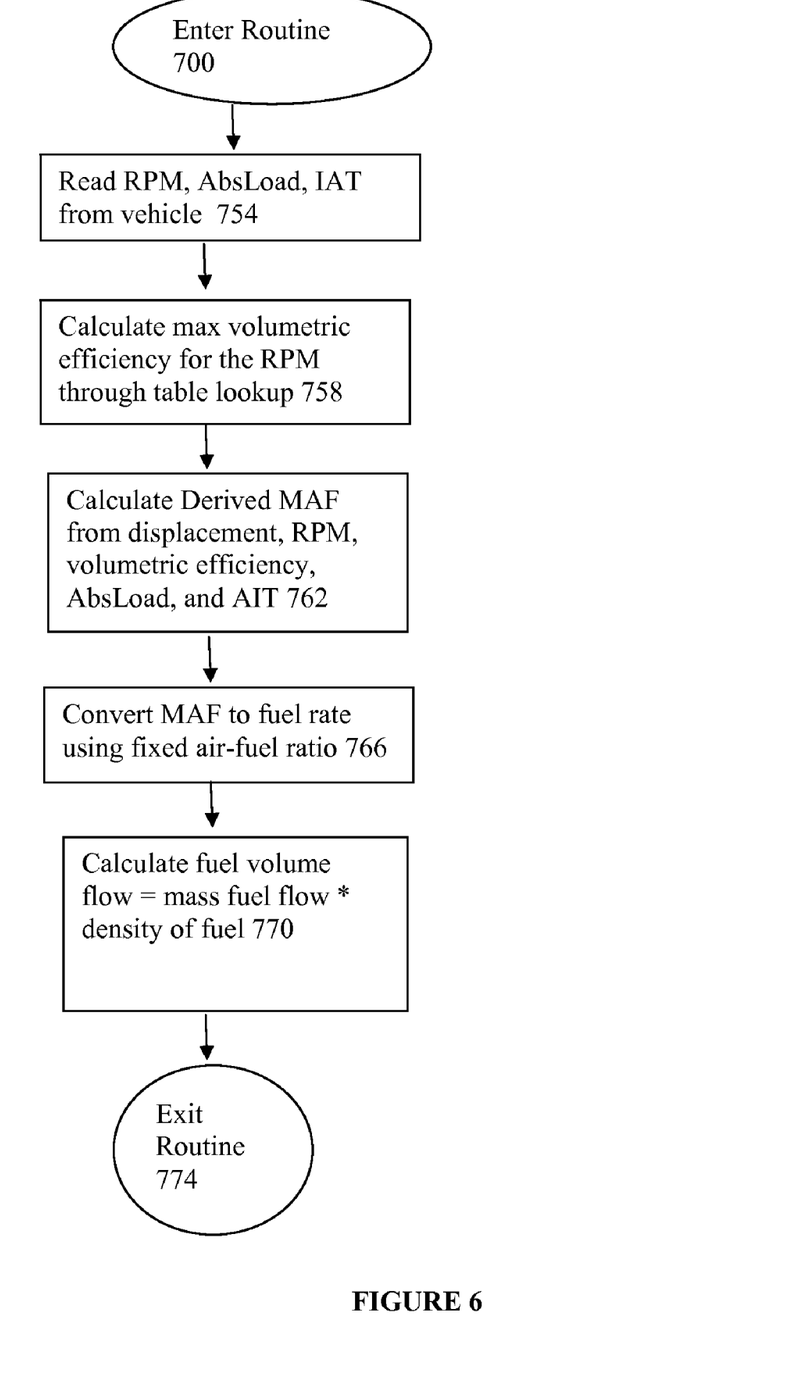
FIG. 6 is a flowchart of the steps for non-MAF case.

Step 592 Calculate Fuel Rate using Non-MAF algorithm (see FIG. 6 and associated explanation)

Figure 4:
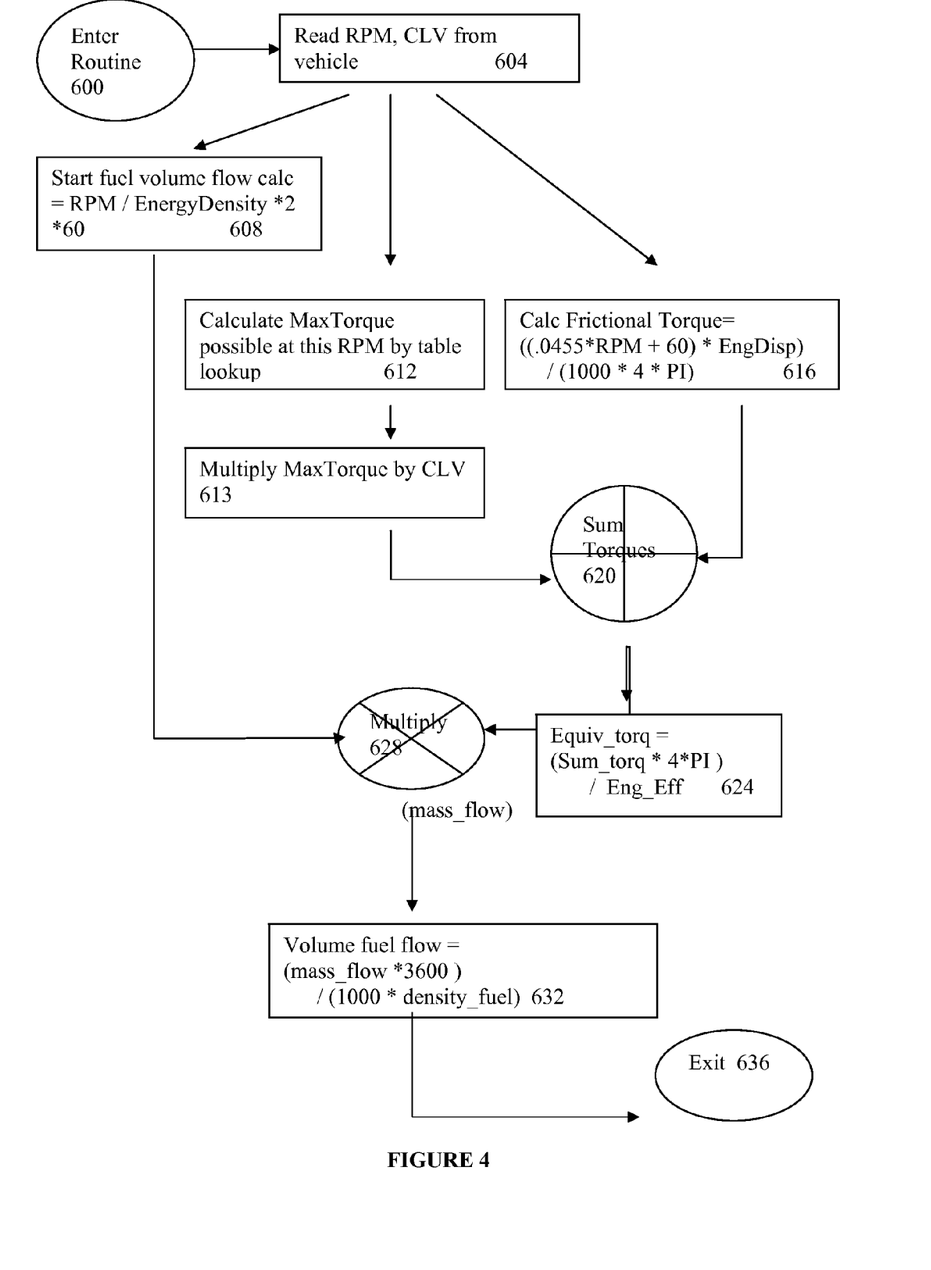
FIG. 4 is a flowchart of the steps for the diesel case for exemplary data.
Figure 5:
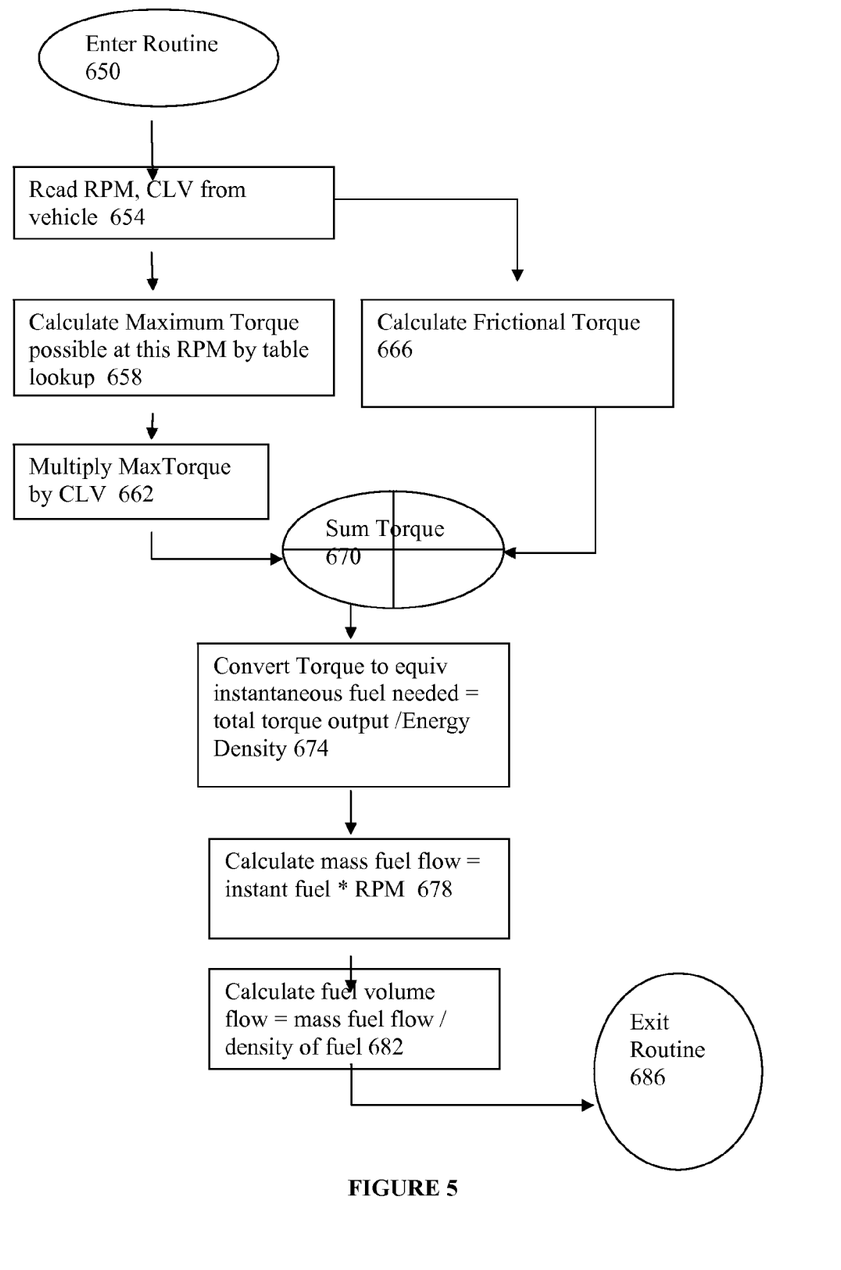
FIG. 5 is a flowchart of the steps for the diesel case.

If the decision (made above) is to proceed to calculate diesel fuel rate (Step 580), then the following steps are taken (with reference to FIG. 4):

Step 600 Enter Routine
Step 604 Read RPM, CLV from vehicle
Step 608 Calculate RPM/EnergyDensity*2*60
Step 612 Calculate MaxTorque possible at this RPM by table lookup
Step 613 Multiply MaxTorque by CLV
Step 616 Calculate Frictional Torque=((0.0455*RPM+60)*EngDisp)/(1000*4*PI)
Step 620 Sum the preceding torques
Step 624 Calculate Equiv_torq=(Sum_torq*4*PI)/Eng_Eff
Step 628 Multiply Equiv_torq and (RPM/EnergyDensity*2*60) to obtain mass_flow
Step 632 Calculate Volume fuel flow=(mass_flow*3600)/(1000*density_fuel)
Step 636 Exit Routine FIG. 5 is a higher level representation and distillation of the principles of the (exemplary detailed) process of FIG. 4. With reference to FIG. 5, the following steps are taken to calculate the diesel fuel rate.

Step 650 Enter Diesel Fuel Rate Routine
Step 654 Read RPM, CLV from vehicle
Step 658 Calculate Maximum Torque possible at this RPM by table lookup
Step 662 Multiply MaxTorque by CLV
Step 666 Calculate Frictional Torque
Step 666 Sum Torque
Step 674 Convert Torque to equiv instantaneous fuel needed=total torque output/Energy Density
Step 678 Calculate mass fuel flow=instant fuel*RPM
Step 682 Calculate fuel volume flow=mass fuel flow/density of fuel
Step 686 Exit Routine The calculation of the Max Brake Torque may be simplified to using a generic Torque curve for a group of similar engines rather than having the specific torque curve for each engine model.

The calculation of the Max Brake Torque may be simplified to using a generic Torque curve for a class or group of similar engines rather than having the specific torque curve for each engine model. As a first level approximation, group all engines from the same manufacturer and basic design regardless of displacement. For example, all Dodge® diesel engines used in the Dodge Ram® pickup truck: 5.9 litre, 6.2 and 6.7 would probably have similar torque curves that would be adequate for the precision of a first level approximation. A second level of approximation would consider large displacement diesel engines. Although specific torque curves of diesel engines from different manufacturers are not identical, one generic torque curve based on the displacement of diesel engines, can be provided.

The Friction Torque calculation may use a more sophisticated model than the one described above. There are many public domain models available within the scope of those skilled in the art.

The Non-MAF Scenario

If the decision (made above) is to proceed to calculate gas fuel rate with non-MAF method (Step 592), then the following steps are taken (with reference to FIG. 6).

As explained above, the most convenient parameter with which to calculate fuel flow is MAF. But a significant minority of passenger vehicles do not report MAF.

Most fuel calculation is based on: a) converting the reported MAF to fuel flow (but some vehicles do not provide this information); or b) using the dwell times of the fuel injector multiplied by the rated flow of the injectors (but these parameters are generally proprietary, and it is difficult to ascertain the rated flow of the injectors); or c) placing actual fuel flow meters in the gas line (but this is expensive and becomes even more problematic in systems that have a circulating system with high return flow-rates to the gas tank)

There is a conventional method that estimates the MAF by using MAP (Manifold absolute pressure or manifold air pressure) and Boyle's Law but this method does not provide consistent results.

Responsive to the above limitations, this invention enables a diagnostic device to calculate the airflow in a generally applicable manner without having to access proprietary information or messages from the vehicle's engine controller.

This invention can be applied to all SI (spark ignited) engines that rely on a constant Air-Fuel Ratio for optimum operation.

This invention calculates the fuel consumption in vehicles by analyzing the subject engine as an air pump and reading publicly available OBDII diagnostic data to estimate the instantaneous airflow through the engine without the need of MAF sensor data.
- uses concept of engine as air pump to determine fuel flow
- fuel calculation uses OBDII Absolute Load Value to estimate instantaneous air flow through engine
- uses digitized table to represent volumetric efficiency for each engine
- Algorithm can be tailored to specific engines by allowing user configuration of a number of engine specific characteristics (such as Engine Displacement)

With reference to FIG. 6, RPM, AbsLoad and IAT are read from the vehicle (Step 754), the maximum volumetric efficiency for the RPM is calculated (Step 758), the Derived MAF is calculated (from Engine displacement, RPM, volumetric efficiency, AbsLoad and ATI (Step 762), and then convert to fuel rate by using a fixed Air/fuel ration (step 766), and then calculate the fuel consumption rate by multiply by the density of the fuel (step 770).

The physical modeling equations underlying the above method, is explained next.

$$\text{Fuel rate(L/hr)} = (\text{Derived MAF}*3600)/\text{AFR}*1000*\text{Density\_fuel} \quad \text{Eqn. (2)}$$

where
AFR is Air/fuel ratio (this can be generally set between 13.5 and 15 in gas engines)
Density_fuel=the weight per unit volume of the fuel $$\text{DerivedMAF} = (\text{STDtemp}/\text{IAT})*\text{AirDensity}*(\text{RPM}/2*60)\text{EngineDispl}*\text{AbsLoad}*F\_vef(\text{RPM}) \quad \text{Eqn. (3)}$$

where
STDtemp is standard temperature
IAT: Intake Air Temperature (from PID 1-0F) from vehicle converted to Kelvin
AirDensity is density of air at standard temperature and pressure
RPM is the engine revolutions (which is converted to seconds and divided by 2 for a 4 stroke engine, since one revolution requires two piston strokes but other conversions to other stroke engines are easily determined by those skilled in the art).
EngineDispl is the engine displacement or the swept volume of the engine (in litres).
AbsLoad is "Absolute Load Value" (from PID 1-43) which is defined as the relative airflow as a percentage of the WOT ("wide open throttle") airflow at that instant. If "Absolute Load Value" is not available, the "Calculated Load Value" (PID 1-04) can be substituted.

F_vef(RPM) is a function table lookup that returns the normalized volumetric efficiency that is publicly available for the subject engine. If the volumetric efficiency (VE) curve for the subject engine is not available, it is well-known to those skilled in the art, that a normalized torque curve for the subject engine can be used instead because there is a well known, close relationship between an engine's VE curve and its torque curve.

The values of AFR, AirDensity, and EngineDispl and the table of Volumetric Efficiency are user configurable.

To refine the accuracy, MAP (Intake manifold absolute pressure) (from PID 1-0B) is used to determine the actual density of the air instead of using a constant.

The Volumetric Efficiency Table can be simplified to a generic table or tables of classes of engines rather than for a specific engine.

Another simplification is possible is to replace the Volumetric Efficiency Table with a scalar configurable constant "VolEff" that represents an averaged volumetric efficiency factor for the normal operating range of the subject engine being monitored. This will not be as precise as the Efficiency-as-a function-of-RPM but may be acceptably accurate for some applications.

Above are merely implementation details for Equations (2) and (3) and are not intended to limit the scope of the principles underlying those equations—variations and alternative implementations would be within the knowledge and efforts of those skilled in the art.

The system is configured as explained above with reference to FIG. 1.

Figure 2B:
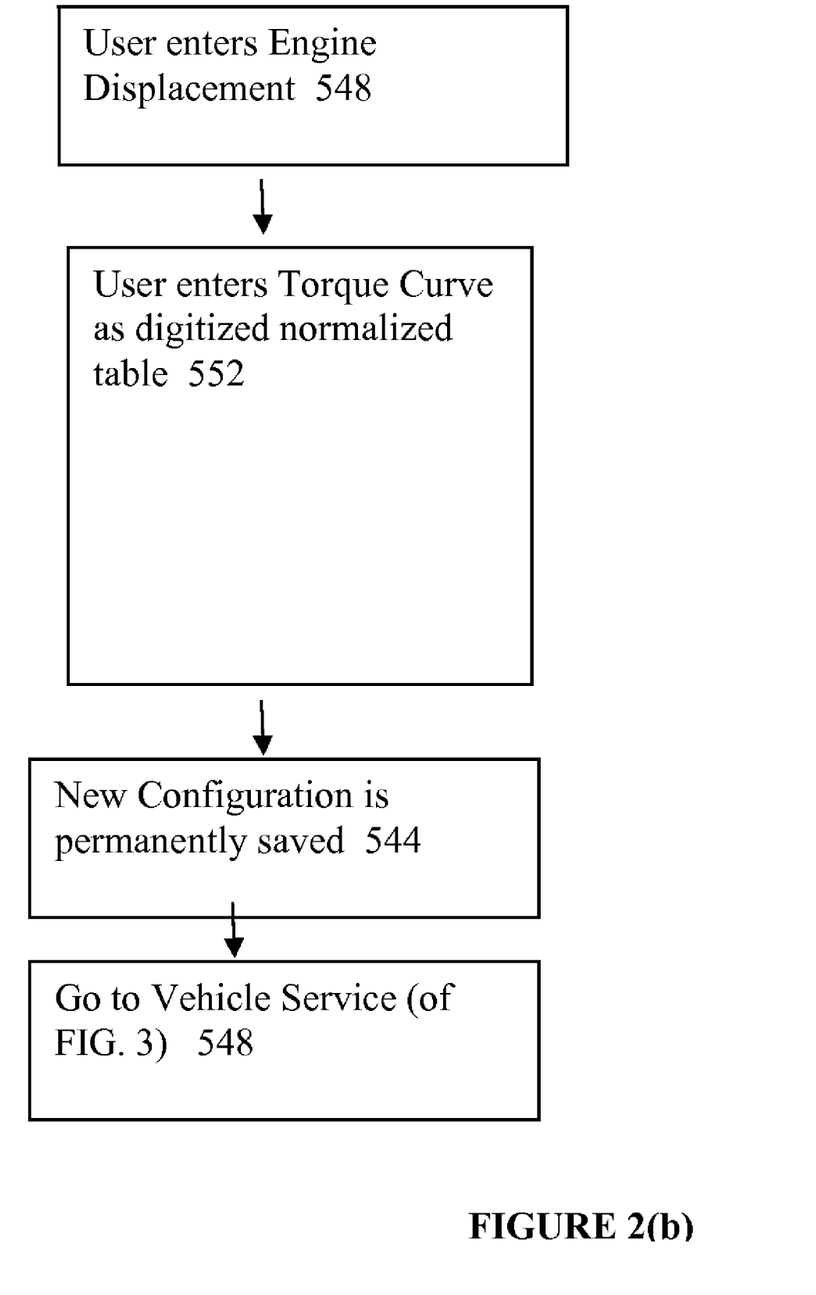

But now, with reference to FIG. 2(b), the following steps are taken.

Step 400 User enters Engine Displacement

Step 552 User enters Volumetric Efficiency Curve (perhaps implemented as a digitized normalized table for a given vehicle/engine).

Step 544 New Configuration is permanently saved

Step 548 Go to Vehicle Service operation (see FIG. 3) and specifically, Step 592 and FIG. 5.

Determination of Effective Volume Using MAF

In vehicles that supply MAF, the volumetric efficiency table and the displacement can be calculated automatically and simultaneously rather than having to download these two parameters to use the proposed algorithms above. This would allow a simplification and compaction of implementation code since only two algorithms (diesel or non-diesel) would be needed.

Effective Volume@RPM is essentially the Engine Displacement*VolumetricEfficiency@RPM. By determining the Effective_Volume over the engine's RPM operating range, would essentially determine the two parameters that normally would have to be obtained externally.

Once this was determined by an initial calibration process, this derived curve would replace the two variables: the F_vef (RPM) and Engine_Displacement in used in Equation (3).

Rearranging the basic equations of the invention, results in Effective Volume as function of RPM.

$$\text{Effective Volume} = \frac{MAF}{AbsLoad * (STDtemp/IAT) * AirDensity * (RPM/2*60)} \quad \text{Eqn. (4)}$$

AbsLoad is PID 1-43. It is a refinement of the CLV (calculated load value) (PID 1-04). AbsLoad is generally available in SI type engines. However, if this PID is unavailable, CLV can be substituted in the algorithms with some loss of accuracy.

The calibration process first samples the engine parameters MAF, RPM and AbsLoad sufficiently to:
 a. determine the maximum engine operating speed;
 b. calculate the effective volume at N evenly-spaced RPM intervals (RPM_INTERVAL below) to cover the entire operating range; and
 c. return to calculating the fuel consumption using the (just populated) table of volumetric efficiency.

The process consists of sampling the engine speed through one ignition cycle of sufficient duration to see the maximum practical engine speed. The RPM_RANGE chosen would be that maximum RPM rounded conveniently (e.g. to the nearest 500 RPMs for appropriate engines and applications). Then calculate RPM_INTERVAL=RPM_RANGE/N.

The second driving cycle would be to populate the volumetric efficiency curve with values calculated using Equation (4). This would be done by creating an array of N+1 elements wherein each element stores three values—the Effective_Volume, RPM, and Count.

Every time a data sample is read, the Effective_Volume is calculated and placed in an element k which is bounded by the two adjacent volumetric_efficiency elements where M*RPM_INTERVAL<sampled RPM<(M+1)*RPM_INTERVAL.

If the array elements k−1 and k+1 are populated with data, then the elements m and m+1 in the target table can be progressively calculated: the algorithm will calculate an incrementally weighted average of all interpolated values at this RPM point.

Volumetric efficiency at element $m$     Eqn. (5)

$$\text{(which corresponds to the EFF\_VOL}[m]) = \frac{(PreviousValue \text{ of } EFF\_VOL[m] * (TotalCount - 1) + NewestInterpolatedValue)}{TotalCount}$$

where TotalCount=the sum of both the bounding elements 'Count(s)' in the actual data array table.

where NewestInterpolatedValue is the interpolated value for the mth RPM_INTERVAL using the lower and higher bounding elements of the actual data array.

Next, Count is incremented and the loop is repeated until Count reaches N+1.

At the end of this cycle, there is a populated table, VEFtable, that represents the averaged results of the Effective Volume of the engine over its operating range which corresponds to (Volumetric Efficiency*Engine Displacement). To use this table in the original fuel consumption algorithm, the Engine Displacement parameter would be set to unity, since that value is now implicitly in the VEFtable that represents the F_vef(RPM) engine curve.

Overview: Calculate each element of the Effective Volumetric (EV) table by incremental averaging of many interpolated points around each element's RPM Objects required for this operation:

An Array with N elements that stores the final derived Volumetric Efficiency at evenly separated RPMs (VE[N])

A table of data sets with (N+1) rows that stores the observed effective volume (OEV), the engine speed (RPM) at which the effective volume was read, and a count of the number of times this row has been updated (CNT).

Each row consists of one each of OEF, RPM, and CNT and each element in the row will be identified by a row number. Therefore the RPM value of row j will be labeled as RPM[j].

The calculation for each element in the VE array is an iterative averaging of subsequent interpolated data sets of the OEV just above and just below the RPM of the that element.

The operational steps are:
 a. Read the RPM, load value, MAF (mass air flow), IAT (intake air temperature) to calculate the OEV (observed effective volume).
 b. Find the row that value should be inserted based on the RPM interval of the target EV table.
 c. If the RPM is not at the beginning of the array: Incrementally modify the VE element just below the RPM
 d. If the RPM is not at the end of the array: Incrementally modify VE just above the RPM read.

To incrementally modify means averaging the calculated result with the latest acquired value which is the interpolation of the most recent value of OEV just above and just below the RPM element. Thus:

$$EV\_new[j] = \frac{(EV\_prev[j] * (TotalCount - 1) + NewestInterpolatedValue)}{TotalCount}$$

where
j=RPMjustread/RPM_INTERVAL
where RPM_INTERVAL=RPM_RANGE/N
TotalCount=CNT[j]+CNT[j+1]−1

Assume that every new value either at j or j+1 will trigger a new calculation in order to obtain a progressively more accurate value of the actual effective volume by reducing the weighting for each subsequent reading. This requires that no calculation will be undertaken nor will the count be incremented until both higher and lower elements are populated with data.

NewestInterplatedValue=OEV[j]+(OEV[j+1]−OEV[j])*(j*RPM_INTERVAL−RPM[j])/(RPM [j+1]−RPM[j])
where OEV[j]=MAF/(AbsLoad*STDTemp/IAT*AirDensity*(RPM[j]/(2*60))
where STDTemp=273.15 degK and AirDensity=1.2754 kg/m^3

Figure 7:
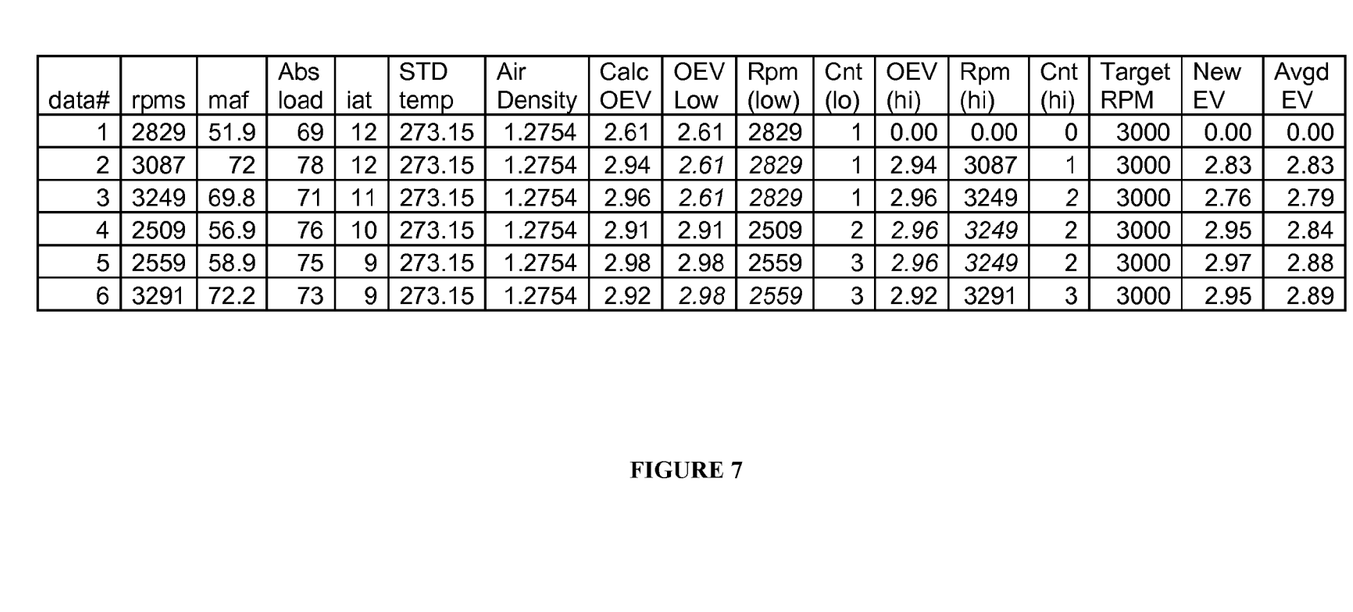
FIG. 7 is Table 2 of exemplary data in the determination of Effective Volume using MAF.

The following numerical example concentrates on only one element of the VE Array. This example assumes that the engine's operating RPM range is [0 to 5000 RPMs] and the VE element to be calculated is for 3000 RPMs. Any data readings where the RPMs are between [2500 and 2999] are in the 5$^{th}$ row and any readings in the RPM range of [3000 to 3499] are in the 6$^{th}$ row of OEV and we are refining the 6$^{th}$ VE element. See Table 2 (FIG. 7).

Table 2 is an iterative example of the above equations with exemplary data from a 3 litre Ford V6. The end result is the 5th element of the VE array would contain the value of 2.89 litres (of effective volume at 3000 RPM).

It is obvious that each reading would allow a second set of calculations either one element above or below the example we have chosen, since it would be possible to simultaneously calculate the j and the j+1 element around the newest data set acquired. In other words, data #1, 4, and 5 would trigger a calculation for EV at 2500 RPMs and data #2, 3 and 6 would trigger calculating EV at 3500 RPMs.

The fuel consumption calculation inventions described herein can be implemented in a conventional vehicle diagnostic computer by programming the operations with any standard programming language like C, C++ or assembler that is capable of converting to the microprocessor's machine code. There are no special hardware requirements (including the microprocessor) except for interface devices to input and decode the vehicle's protocol messages, and such devices are commercially available devices specifically designed for any of the vehicle protocols (CAN, J1580, or ISO9141, etc.) mentioned herein.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims. All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

The invention claimed is:

1. A computer-implemented method for calculating fuel consumption in an engine connected to an engine controller unit and using a type of fuel, the method comprising the computer-implemented steps of:
   obtaining data relating to the engine from the engine controller unit;
   inferring the fuel type from the data;
   selecting an algorithm based on the fuel type, from a plurality of algorithms; and
   calculating the fuel consumption using the selected algorithm;
   wherein the data does not directly specify the fuel type;
   wherein the fuel type is inferred from data comprising one or more of: dwell time, injection pressure, absolute load value, short term trim and long term trim; and
   wherein the fuel type is inferred using fuzzy logic.

2. The method according to claim 1 wherein the calculation is preformed in real time.

3. The method according to claim 1, wherein if the fuel type is inferred to be gasoline, the method further includes the step of determining whether the data comprises mass air flow.

4. A computer-implemented method for calculating fuel consumption in an engine connected to an engine controller unit and using a type of fuel, the method comprising the computer-implemented steps of:
   obtaining data relating to the engine from the engine controller unit;
   inferring the fuel type from the data;
   selecting an algorithm based on the fuel type, from a plurality of algorithms; and
   calculating the fuel consumption using the selected algorithm;
   wherein if the fuel type is inferred to be diesel then:
      the data obtained comprises RPM and calculated load value;
      the algorithm uses constants representing engine displacement, diesel energy density, diesel density and engine efficiency; and
      the algorithm comprises the steps of:
         determining friction torque;
         determining maximum brake torque corresponding to the RPM;
         calculating brake torque to be proportional to the maximum brake torque multiplied by the calculated load value;
         determining equivalent torque by calculating a sum of the brake torque and the friction torque and then dividing the sum by the engine efficiency; and
         determining the fuel consumption in terms of volume per unit time by calculating a product of the RPM and the equivalent torque and dividing the product by the diesel energy density and the diesel density.

5. The method according to claim 4, wherein friction torque is calculated to be proportional to RPM added to a constant and then multiplied by engine displacement.

6. The method according to claim 4 wherein the maximum brake torque is determined from a look-up table comprising a generic torque curve for a group of similar engines.

7. A computer-implemented method for calculating fuel consumption in an engine connected to an engine controller unit and using a type of fuel, the method comprising the computer-implemented steps of:
   obtaining data relating to the engine from the engine controller unit;
   inferring the fuel type from the data;
   selecting an algorithm based on the fuel type, from a plurality of algorithms; and
   calculating the fuel consumption using the selected algorithm;
   wherein if the fuel type is inferred to be gasoline, the method further includes the step of determining whether the data comprises mass air flow; and
   wherein if the data does not include mass air flow:
      the data obtained comprises RPM, intake air temperature and load value;
      the algorithm uses constants representing air to fuel ratio, engine displacement, standard temperature and gasoline density;
      the algorithm uses a value for air density; and
      the algorithm comprises the steps of:
         determining volumetric efficiency for the engine at the obtained RPM;
         deriving mass air flow as proportional to standard temperature, air density, RPM, engine displacement, load value and volumetric efficiency and inversely proportional to intake air temperature; and
         calculating fuel consumption in terms of volume per unit time by dividing the derived mass air flow by the air to fuel ratio and the gasoline density.

8. The method according to claim 7 wherein the load value is either absolute load value or calculated load value.

9. The method according to claim 7 wherein the data comprises intake manifold absolute pressure and the value for air density is determined using the intake manifold absolute pressure.

10. The method according to claim 7 wherein volumetric efficiency is determined from a look up table.

11. The method according to claim 10 wherein the look up table is generic and comprises values applicable to a group of engines.

12. The method according to claim 7 wherein volumetric efficiency is determined from a torque curve.

13. The method according to claim 7 wherein volumetric efficiency is determined using a constant that represents an averaged volumetric efficiency for a normal operating range of the engine.

14. A computer-implemented method for calculating fuel consumption in an engine connected to an engine controller unit and using a type of fuel, the method comprising the computer-implemented steps of:

obtaining data relating to the engine from the engine controller unit;

inferring the fuel type from the data;

selecting an algorithm based on the fuel type, from a plurality of algorithms; and     calculating the fuel consumption using the selected algorithm;

wherein if the fuel type is inferred to be gasoline, the method further includes the step of determining whether the data comprises mass air flow; and     wherein if the data includes mass air flow:

the data obtained comprises RPM, intake air temperature and load value;

the algorithm uses constants representing mass air flow, air to fuel ratio, standard temperature and gasoline density;

the algorithm uses a value for air density; and         the algorithm comprises the steps of:

determining effective volume for the engine at the obtained RPM by reading a numerical value for the effective volume from a look-up table, said numerical value proportional to the mass air flow and the intake air temperature and inversely proportional to the load value, the standard temperature, the air density and the RPM; and             calculating fuel consumption in terms of volume per unit time to be proportional to standard temperature, air density, RPM, load value and effective volume and inversely proportional to intake air temperature, air to fuel ratio and gasoline density.

15. The method according to claim 14 wherein the load value is either absolute load value or calculated load value.

16. The method according to claim 14 wherein the data comprises intake manifold absolute pressure and the value for air density is determined using the intake manifold absolute pressure.

* * * * *